March 1, 1932.    P. E. FARRELLY    1,847,825
BINDER FOR SALES COUPONS
Filed May 22, 1930
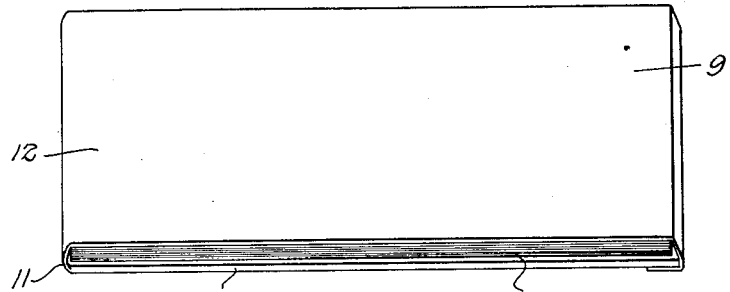
Fig. 1.
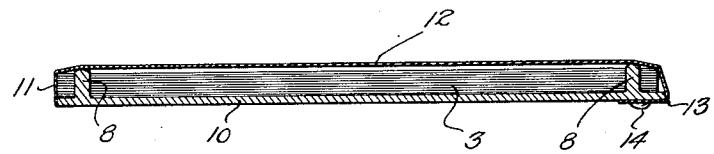
Fig. 2.
Fig. 3.
Inventor
PETER E. FARRELLY.
By O'Boyle and Norton
his Attorneys

Patented Mar. 1, 1932

1,847,825

UNITED STATES PATENT OFFICE

PETER E. FARRELLY, OF CHESTER, PENNSYLVANIA

BINDER FOR SALES COUPONS

Application filed May 22, 1930. Serial No. 454,784.

This invention relates to improvements in sales coupons and more particularly to a sales coupon having a plurality of detachable portions, at least one of which is adapted to serve as a promissory note.

The present invention concerns a novel means which is adapted to promote savings as well as permit suitable advertising of a business by means of special sales at which promissory notes of certain value are issued to each customer. Such notes may be issued by a central advertising agency or bank or the like and are issued for definite monetary values of the order of those obtained as discounts in the ordinary retail sales, say ten, twenty, forty, sixty cents and so forth.

By the issuance of promissory notes of fractional denominations, the said notes being due and payable every six months, say in March and September, a housewife is enabled to accumulate credit savings over a half-year period and have the said savings available for use at periods when the spring and fall merchandising sales are usually held. This feature is a distinct advantage to people accustomed to Christmas savings and vacation savings funds, as it permits the maintenance of such funds from monies received, while, in effect, requiring the compulsory saving of merchandise credits in the form of promissory notes which are non-negotiable and payable only at certain periods.

As above outlined, the sales coupons would be purchased from and authenticated by a central agency who would have deposited therewith the funds required to meet all issued notes. By holding these funds, or investing them in convertible securities, approved by proper State authorities, the central agency is enabled to realize on the money paid in in order to finance the organization. Where desired, and where the contracting parties deem it necessary or agree thereto, the merchants may pay a certain premium on the face value of the issued notes to cover the necessary costs.

The above described instruments are not intended to replace or simulate trading stamps or other like discount checks, which are normally issued in appropriate amounts at the time of each individual sale. The sales coupons of the present invention are particularly adapted for issuance at or in conjunction with special sales where it is desired to give substantial discounts to the buying public and to issue evidence thereof in a form in which the customer may deposit them in the ordinary manner in the usual banking institutions.

An association of merchants issuing the improved sales coupons could appropriately hold sales of their respective types of merchandise on a given day in any given geographical location, thus stimulating a customer to do all of his or her shopping in a given neighborhood on a given day. This condition pre-supposes that for each neighborhood the issuance of special sales coupons of the type above indicated and hereinafter to be described more in detail, would be restricted to a single individual for each type of merchandise bought. For example, there would appropriately be one concern dealing in furniture, another dealing in hardware, yet another dealing in groceries, and so on. By this means such a group could appropriately join in an advertising campaign or program to the mutual advantage of each other and without involving discrimination between the several members of the group.

Referring now to the drawings, there is disclosed certain of the novel sales coupons comprehended within the spirit and scope of the invention, and, in addition, there is disclosed a novel holder for such coupons whereby to remind the customers of the advantages of collecting their promissory notes as well as providing a ready means for retaining them.

In the drawings, like numerals refer to similar parts throughout the several views, of which Fig. 1 is a front view of a combination sales coupon and promissory note;

Fig. 2 is a perspective, of an improved holder containing a plurality of notes shown in Fig. 1, and Fig. 3 is a longitudinal section through the device shown in Fig. 2.

Referring now to Fig. 1 the improved sales coupon comprises a tri-partite member having sections 1, 2 and 3 adapted to be separated from each other along the lines of perforations 4 and 5. Section 1 may comprise a permanent stub adapted to be retained by the issuing organization in whose custody the funds for the payment of the notes are deposited. Section 2 may comprise a detachable stub adapted to be retained by the dealer or body issuing the evidence of indebtedness. Section 3 may comprise a non-negotiable promissory note in the usual legal form for any given amount as previously indicated. These sections may be provided with longitudinal apertures 6 or simple circular apertures 7 adapted to engage spindles 8 of an improved holder 9.

The improved holder comprises a substantially inflexible base portion 10, with which is associated the members 8 adapted to engage the apertures 6 or 7 of the members 3. As will be readily appreciated, the members 8 may be given any desired configuration and number to conform to and be adapted to engage the appropriate apertures in the member 3. It is to be noted further, that the members 8 may be integrally formed with the member 10, or may comprise separate members mechanically secured to the base members in the usual manner.

Attached to the base of the note holder is a flexible section 11 which is of such a size as to be adapted to overlie the entire length of the upper portion of the holder, as indicated generally at 12, and be supported at the upper portions of the members 8. In addition, the member 11 is provided with a further extending portion 13 adapted to overlie the other end of the member 9. Any suitable fastening means such as a button 14 may be suitably secured to member 13 and be adapted to engage cooperating means secured to member 10.

While the improved holder herein disclosed has been described particularly in relation to its use with a plurality of notes 3, it will be understood that its use is not restricted to these coupons but may be used for a variety of novelties. In addition to the foregoing it would be appreciated that the surfaces of the holder may be ornamented in any desired manner, or be provided with appropriate advertising markings and the like.

While certain particular types of apertures 6 and 7 in the coupon have been disclosed as being adapted to cooperate with correspondingly shaped studs or supporting members 8 of the novel holder, herein described, it will, of course be appreciated that any suitable configuration may be adapted without departing from the spirit and scope of the invention.

While I have shown and described the preferred embodiment of my invention, I wish it to be understood that I do not confine myself to the precise details of construction herein set forth, by way of illustrations, as it is apparent that many changes and variations may be made therein, by those skilled in the art, without departing from the spirit of the invention, or exceeding the scope of the appended claims.

I claim:

1. An article of the character described comprising a holder having a substantially inflexible thickened base portion, integral spindles extending upwardly from said base portion and near the ends thereof, a flexible upper cover portion constituting an extension of the said base portion and adapted to overlie the said spindles and be spaced thereby from the said base, an extension on said flexible portion having fastening means associated therewith and adapted to engage cooperating means secured to an end of said base.

2. An article of the character described comprising a holder having a substantially inflexible thickened base portion, integral spindles extending upwardly from said base portion and near the ends thereof, a flexible upper cover portion constituting an extension of the said base portion and adapted to overlie the said spindles and be spaced thereby from the said base, an extension on said flexible portion having fastening means associated therewith and adapted to engage cooperating means secured to an end of said base, and coupons associated with said holder and adapted to be retained by the cooperative action of said spindles and cover, said coupons having slots of substantial width disposed near the ends of the coupons and parallel thereto.

In testimony whereof I affix my signature.

PETER E. FARRELLY.